US012014656B2

(12) United States Patent
Liu

(10) Patent No.: US 12,014,656 B2
(45) Date of Patent: Jun. 18, 2024

(54) SIGN FRAME SYSTEM

(71) Applicant: WICKET AND SIGNS LLC, Newnan, GA (US)

(72) Inventor: Hongwei Liu, Newnan, GA (US)

(73) Assignee: WICKET AND SIGNS LLC, Newnan, GA (US)

( * ) Notice: Subject to any disclaimer, the term of this patent is extended or adjusted under 35 U.S.C. 154(b) by 197 days.

(21) Appl. No.: 17/873,972

(22) Filed: Jul. 26, 2022

(65) Prior Publication Data

US 2023/0033926 A1 Feb. 2, 2023

Related U.S. Application Data

(60) Provisional application No. 63/228,059, filed on Jul. 31, 2021.

(51) Int. Cl.
*G09F 7/18* (2006.01)

(52) U.S. Cl.
CPC ........ *G09F 7/18* (2013.01); *G09F 2007/1834* (2013.01)

(58) Field of Classification Search
CPC ........................... G09F 2007/1834; G09F 7/18
See application file for complete search history.

(56) References Cited

U.S. PATENT DOCUMENTS 958,082 A * 5/1910 Bland ....................... G09F 7/18 40/607.04
1,406,916 A 2/1922 Arnold
1,573,101 A 2/1926 Steckol
1,649,249 A 11/1927 Newman
2,865,124 A 12/1958 Mortellito
2,920,768 A * 1/1960 Halip .................... A47F 5/0815 211/183
3,243,051 A * 3/1966 Runhke ................... F16B 7/044 403/245
3,370,369 A 2/1968 Look
3,494,405 A 2/1970 Sandahl et al.
3,889,409 A 6/1975 Thomas
4,009,532 A 3/1977 Thomas
4,103,445 A 8/1978 Smith et al.
4,173,086 A 11/1979 Hempfling
4,241,530 A 12/1980 Hartvig
4,259,803 A 4/1981 Sittler
4,658,527 A 4/1987 Pingel
4,660,310 A 4/1987 Farmer
4,700,655 A 10/1987 Kirby
(Continued)

*Primary Examiner* — David R Dunn
*Assistant Examiner* — Christopher E Veraa
(74) *Attorney, Agent, or Firm* — Thomas B. McGurk

(57) ABSTRACT

Sign frame system and components of sign frame systems for bag signs and fold-over signs are described. The sign frame system can comprise a plurality of frame sections with at least one frame section connected to at least one other frame section by a sleeve connector having a connector outer sleeve and a connector inner sleeve axially aligned with the connector outer sleeve and a connector dimple formed therein. The sign frame system also can comprise a first frame section connected to a second frame section with each of the first and second frame sections comprising a tenon projecting from an end shoulder aligned at an end of the respective frame section, wherein the first and second frame sections mate by the alignment of the tenons.

20 Claims, 14 Drawing Sheets

(56) References Cited

U.S. PATENT DOCUMENTS

| | | | | |
|---|---|---|---|---|
| 4,771,560 | A | 9/1988 | Richards | |
| 4,817,319 | A | 4/1989 | Vitale | |
| 4,864,757 | A | 9/1989 | Lovett | |
| 4,866,866 | A | 9/1989 | Rotter | |
| 4,878,303 | A | 11/1989 | Banniza et al. | |
| 4,885,860 | A | 12/1989 | Huenefeld | |
| 4,894,937 | A | 1/1990 | Davis | |
| 4,916,840 | A | 4/1990 | Getz | |
| 4,960,258 | A | 10/1990 | Stocker et al. | |
| 5,042,183 | A | 8/1991 | Kennedy | |
| 5,083,390 | A | 1/1992 | Edman | |
| 5,103,582 | A | 4/1992 | Farmer | |
| 5,307,580 | A | 5/1994 | Farmer | |
| 5,595,010 | A | 1/1997 | Fuller | |
| 5,667,855 | A | 9/1997 | Borden et al. | |
| 5,878,517 | A | 3/1999 | Gill | |
| 5,937,555 | A | 8/1999 | Query | |
| 6,009,652 | A | 1/2000 | Smith | |
| 6,038,802 | A | 3/2000 | Tidwell | |
| 6,170,183 | B1 | 1/2001 | Keefe | |
| 6,370,803 | B1 | 4/2002 | Burquest | |
| 6,397,451 | B1 | 6/2002 | Gill | |
| 6,892,486 | B2 | 5/2005 | Haggard, Jr. | |
| 7,128,127 | B1 * | 10/2006 | Love | G09F 17/00<br>40/607.01 |
| 7,347,018 | B2 | 3/2008 | Haggard, Jr. | |
| 7,367,147 | B2 | 5/2008 | Harms | |
| 7,437,844 | B1 | 10/2008 | Kennedy | |
| 7,730,653 | B2 | 6/2010 | Zazworsky, Jr. | |
| 7,743,539 | B1 | 6/2010 | Kennedy | |
| 8,984,783 | B2 | 3/2015 | Cepek | |
| 9,245,462 | B2 | 1/2016 | Mora Vera | |
| 9,269,282 | B1 | 2/2016 | Hartman | |
| 9,275,563 | B1 | 3/2016 | Hartman | |
| 9,620,036 | B1 | 4/2017 | Hartman | |
| 9,633,585 | B1 | 4/2017 | Hanes | |
| 10,037,718 | B1 | 7/2018 | Hartman | |
| 10,214,934 | B2 | 2/2019 | Hunt et al. | |
| 10,283,021 | B1 | 5/2019 | Hartman | |
| 10,679,526 | B1 | 6/2020 | Ritter, Jr. | |
| 10,867,529 | B2 | 12/2020 | Huenefeld | |
| 2022/0343805 | A1 * | 10/2022 | Harms | G09F 7/18 |
| 2023/0033926 | A1 * | 2/2023 | Liu | G09F 15/0062 |

* cited by examiner

SIGN FRAME SYSTEM

CROSS REFERENCE TO RELATED APPLICATIONS

This application claims priority to U.S. Provisional Patent Application Ser. No. 63/228,059, entitled "Connectors for a Bag Sign" filed Jul. 31, 2021 and which is hereby incorporated by reference in its entirety herein to provide continuity of disclosure.

BACKGROUND

Conventional frames for bag signs and two-sided fold-over signs tend to be constructed as unitary frames having elongated legs. Due to the unitary construction and elongated legs, conventional frames for bag signs and fold-over signs tend to be awkward to handle, store and transport. Furthermore, conventional frames for bag signs and fold-over signs tend to flex and bow, thereby reducing their effectiveness in properly supporting and aligning the bag signs or fold-over signs they support.

Consequently, there is a need for a sign frame system that can address one or more of these and other shortcomings.

SUMMARY

The present disclosure encompasses a sign frame system comprising: a frame body comprising a crossbar, a first leg connected to the crossbar, a second leg connected to the crossbar, a first shoulder disposed between the crossbar and the first leg, and a second shoulder disposed between the crossbar and the second leg, wherein the frame body comprises a first frame section and a second frame section detachably connected to the first frame section by a sleeve connector, wherein the sleeve connector comprises a first connector end and a second connector end, wherein the sleeve connector comprises a connector channel extending from the first connector end to the second connector end, wherein the sleeve connector comprises a connector outer sleeve and a connector inner sleeve disposed in the connector outer sleeve, wherein the sleeve connector comprises a first connector opening formed in the first connector end and a second connector opening formed in the second connector end, wherein the sleeve connector comprises a connector dimple, wherein the connector dimple comprises an outer sleeve dimple formed in the connector outer sleeve and an inner sleeve dimple formed in the connector inner sleeve, wherein the connector dimple forms a first frame section stop in the connector channel and a second frame section stop in the connector channel, wherein the first frame section comprises a first frame section end, wherein the second frame section comprises a second frame section end, and wherein the first frame section end is disposed adjacent the first frame section stop in the connector channel and the second frame section end is disposed adjacent the second frame section stop in the connector channel.

In one aspect, the first frame section end is spaced apart from the second frame section end in the connector channel. In another aspect, the connector outer sleeve comprises a metal. In a further aspect, the connector inner sleeve comprises a polymer. In still another aspect, the first frame section comprises a first frame section second end, wherein the first frame section second end comprises a first end shoulder and a first tenon projecting from the first end shoulder, wherein the first tenon comprises a first cheek, wherein the frame body comprises a third frame section detachably connected to the first frame section, wherein the third frame section comprises a third frame section first end, wherein the third frame section first end comprises a second end shoulder and a second tenon projecting from the second end shoulder, wherein the second tenon comprises a second cheek, wherein the frame body comprises a second sleeve connector detachably connected to the first frame section and the third frame section, wherein the first frame section second end and the third frame section first end are disposed in the second sleeve connector, wherein the first frame section second end contacts the third frame section first end, wherein the first end shoulder contacts the second tenon, wherein the second end shoulder contacts the first tenon, and wherein the first cheek contacts the second cheek. In one aspect, the frame body comprises a plurality of sleeve connectors. In yet another aspect, the frame body comprises a second crossbar connected to the first leg and the second leg. In a further aspect, the frame body comprises an intermediate leg disposed between the first leg and the second leg, and wherein the intermediate leg is connected to the crossbar and the second crossbar. In still a further aspect, the first frame section and the second frame section cooperate to form the crossbar, the first leg, or the second leg.

The present disclosure encompasses a sign frame system comprising: a frame body comprising a crossbar, a first leg connected to the crossbar, a second leg connected to the crossbar, a first shoulder disposed between the crossbar and the first leg, and a second shoulder disposed between the crossbar and the second leg, wherein the frame body comprises a first frame section and a second frame section detachably connected to the first frame section by a sleeve connector, wherein the first frame section comprises a first frame section end, wherein the first frame section end comprises a first end shoulder and a first tenon projecting from the first end shoulder, wherein the first tenon comprises a first cheek, wherein the second frame section comprises a second frame section end, wherein the second frame section end comprises a second end shoulder and a second tenon projecting from the second end shoulder, wherein the second tenon comprises a second cheek, wherein the frame body comprises a sleeve connector detachably connected to the first frame section and the second frame section, wherein the first frame section end and the second frame section end are disposed in the sleeve connector, wherein the first frame section end contacts the second frame section end, wherein the first end shoulder contacts the second tenon, wherein the second end shoulder contacts the first tenon, and wherein the first cheek contacts the second cheek.

In one aspect, the sleeve connector comprises a connector outer sleeve and a connector inner sleeve axially aligned with the connector outer sleeve. In another aspect, the connector outer sleeve comprises a metal. In a further aspect the connector inner sleeve comprises a polymer. In still another aspect, the frame body comprises a plurality of sleeve connectors. In one aspect, the frame body comprises a second crossbar connected to the first leg and the second leg. In yet another aspect, the frame body comprises an intermediate leg disposed between the first leg and the second leg, and wherein the intermediate leg is connected to the crossbar and the second crossbar. In still a further aspect, the first frame section comprises a first frame section second end, wherein the frame body comprises a third frame section detachably connected to the first frame section by a second sleeve connector, wherein the third frame section comprises a third frame section first end, wherein the second sleeve connector comprises a first connector end and a second connector end, wherein the second sleeve connector comprises a connector channel extending from the first connector end to the second connector end, wherein the second sleeve connector comprises a connector outer sleeve and a connector inner sleeve concentrically aligned with the connector outer sleeve, wherein the second sleeve connector comprises a first connector opening formed in the first connector end and a second connector opening formed in the second connector end, wherein the second sleeve connector comprises a connector dimple, wherein the connector dimple comprises an outer sleeve dimple formed in the connector outer sleeve and an inner sleeve dimple formed in the connector inner sleeve, wherein the connector dimple forms a first frame section stop in the connector channel and a second frame section stop in the connector channel, wherein the first frame section second end is disposed adjacent the first frame section stop in the connector channel, and wherein the third frame section first end is disposed adjacent the second frame section stop in the connector channel.

The present disclosure comprises a sign frame system for a bag sign or a fold-over sign, the sign frame system comprising: a frame body comprising a plurality of crossbars, a plurality of legs connected to the plurality of crossbars, and a plurality of frame sections detachably connected by a plurality of sleeve connectors, wherein the plurality of frame sections comprises a first frame section and a second frame section, wherein each sleeve connector of the plurality of sleeve connectors comprises a first connector end and a second connector end, a connector channel extending from the first connector end to the second connector end, a first connector opening formed in the first connector end and a second connector opening formed in the second connector end, and a connector dimple, wherein the connector dimple forms a first frame section stop in the connector channel and a second frame section stop in the connector channel, and wherein an end of the first frame section and an end of the second frame section are disposed in the sleeve connector.

In one aspect, each sleeve connector of the plurality of sleeve connectors comprises a connector outer sleeve and a connector inner sleeve, and wherein the connector dimple comprises an outer sleeve dimple formed in the connector outer sleeve and an inner sleeve dimple formed in the connector inner sleeve. In another aspect, the plurality of frame sections comprises a third frame section, wherein the first frame section comprises a first frame section second end, wherein the first frame section second end comprises a first end shoulder and a first tenon projecting from the first end shoulder, wherein the first tenon comprises a first cheek, wherein the third frame section comprises a third frame section first end, wherein the third frame section first end comprises a second end shoulder and a second tenon projecting from the second end shoulder, wherein the second tenon comprises a second cheek, wherein the frame body comprises a connector detachably connected to the first frame section and the third frame section, wherein the first frame section second end and the third frame section first end are disposed in the connector, wherein the first frame section second end contacts the third frame section first end, wherein the first end shoulder contacts the second tenon, wherein the second end shoulder contacts the first tenon, and wherein the first cheek contacts the second cheek.

These and other aspects of the present disclosure are set forth in greater detail below and in the drawings for which a brief description is provided as follows.

DETAILED DESCRIPTION

The present disclosure encompasses sign frame systems, sleeve connectors, frame sections, frame bodies, and components of sign frame systems that can be used with bag signs and/or fold-over signs. The present disclosure refers in detail below to various aspects of the sign frame systems, the sleeve connectors, frame sections, frame bodies, and components of sign frame system are illustrated in the accompanying drawings. Wherever possible, the application uses the same reference numbers throughout the drawings to refer to the same or similar items.

As used herein, the singular forms of "a," "an," and "the" encompass the plural forms thereof unless otherwise indicated. As used herein, the phrase "at least one" includes all numbers of one and greater. As used herein, the term "and/or" refers to one or all of the listed elements or a combination of any two or more of the listed elements.

The sign frame systems encompassed by the present disclosure can comprise a plurality of frame sections detachably connected to each other by one or more sleeve connectors to configure a sign frame body that can provide support and a base for bag signs, fold-over signs and other types of light weight signs. The sign frames systems that have the plurality of frame sections and the sleeve connectors can comprise two or more legs extending downward from one or more crossbars that connect two or more of the legs to each other. The crossbars of the sign frame bodies constructed with the sign frame systems encompassed by the present disclosure can comprise one or more crossbar sections that are detachably connected by one or more sleeve connectors to the other frame sections of the sign frame systems.

Figure 1:
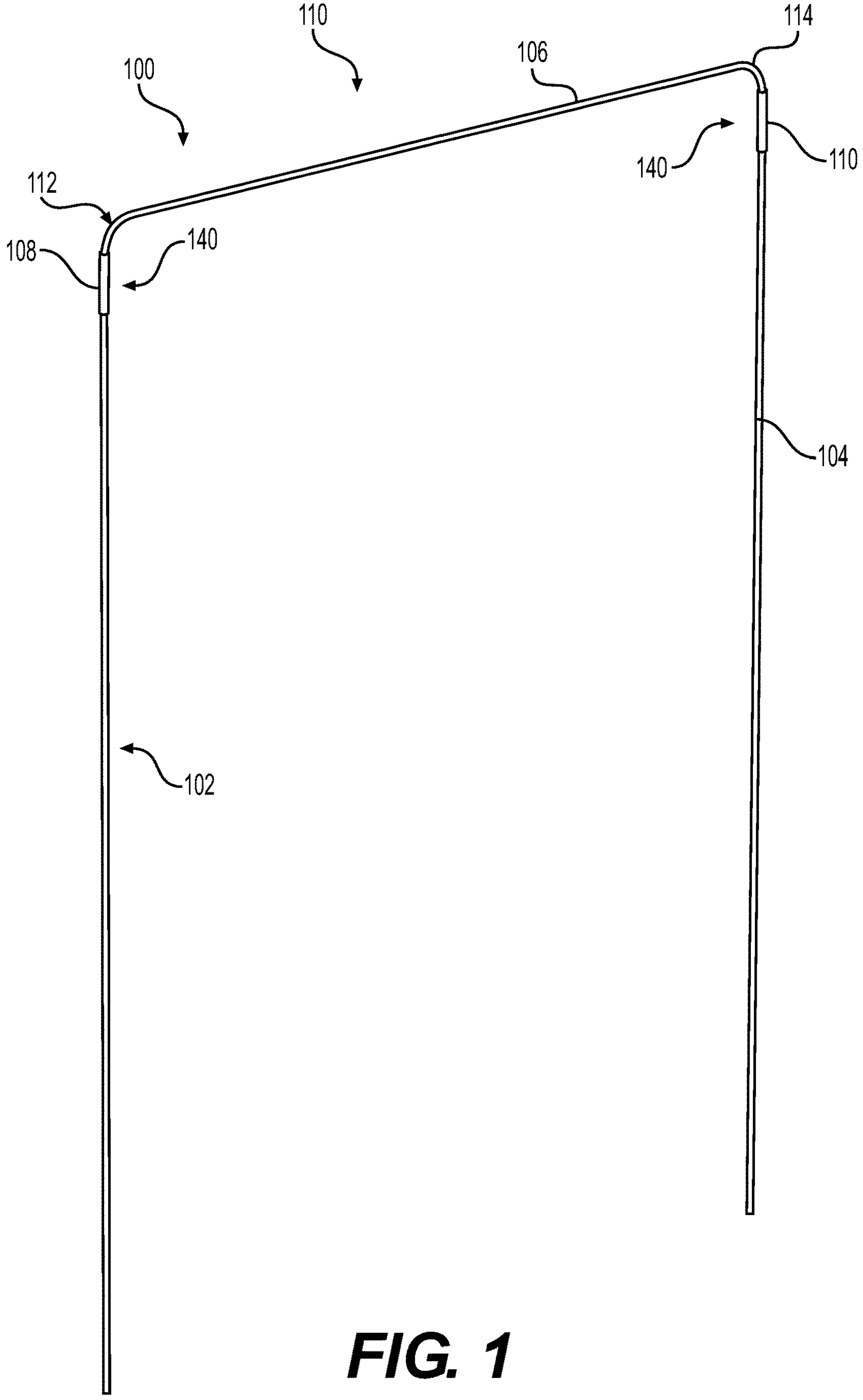
FIG. 1 is a perspective view of a sign frame system encompassing aspects of the present disclosure.

FIG. 1 illustrates a sign frame system 100 encompassing aspects of the present disclosure. As shown in FIG. 1, the sign frame system 100 comprises a frame body 110 comprising a crossbar 106 connected to a first leg 102, a second leg 104 aligned opposing the first leg 102, and a plurality of sleeve connectors 140 connecting the frame sections of the first leg 102, the second leg 104, and the crossbar 106. The crossbar 106 is a frame section that defines a first shoulder 112 and a second shoulder 114 of the frame body 110. The first leg 102 is aligned adjacent to the first shoulder 112 and depends downwardly therefrom, and the second leg 104 is aligned adjacent to the second shoulder 114 and depends downwardly therefrom. The first leg 102 is aligned parallel to the second leg 104. The crossbar 106, the first leg 102, and the second leg 104 are aligned in a planar arrangement in which each component is aligned in a plane. The crossbar 106 is detachably connected to the first leg 102 by a first sleeve connector 108, and the crossbar 106 is detachably connected to the second leg by a second sleeve connector 110.

Figure 2:
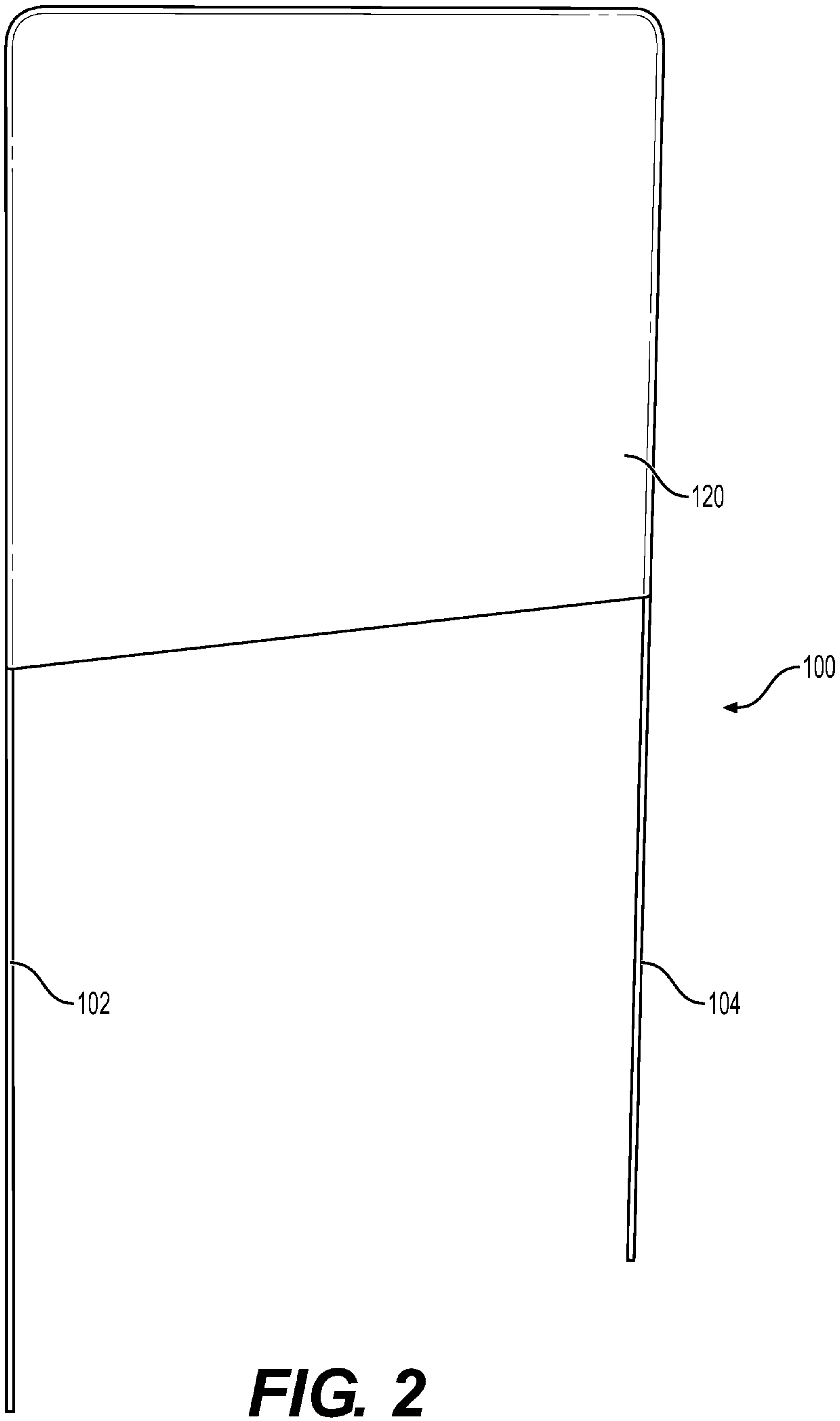
FIG. 2 is a perspective view of the sign frame system shown in FIG. 1 with a bag sign installed on the sign frame system.

As shown in FIG. 2, a sign 120 can be mounted to the sign frame system 100. The sign 120, as illustrated in FIG. 2, can be a bag sign formed of a continuous web that is closed on the top and sides and has an opening formed in the bottom thereof. The bag sign can be fitted over the top of the sign frame system 100 and rest upon, and be supported by, the crossbar 106 and the first leg 102 and the second leg 104. The sign 120 also can be configured as a fold-over sign, not shown, that has two major faces connected by an intermediate strip. The intermediate strip of the fold-over sign can be aligned on the crossbar 106 and the two major faces can extend downward therefrom on opposing sides of the sign frame system 100. Indicia can be provided on the outside of the sign 120, either on the outside of the bag sign or on the major faces that face outward on the fold-over sign. The first leg 102 and the second leg 104 can be inserted into the ground or otherwise supported so that each of the first leg 102 and the second leg 104 extend upward, thereby supporting the sign 120. Each of the first leg 102 and the second leg 104 are straight frame sections that are formed of cylindrical metal wire or tubing, whereas the crossbar 106 is an elongated, U-shaped frame section formed of the same cylindrical metal wire or tubing.

Figure 3:
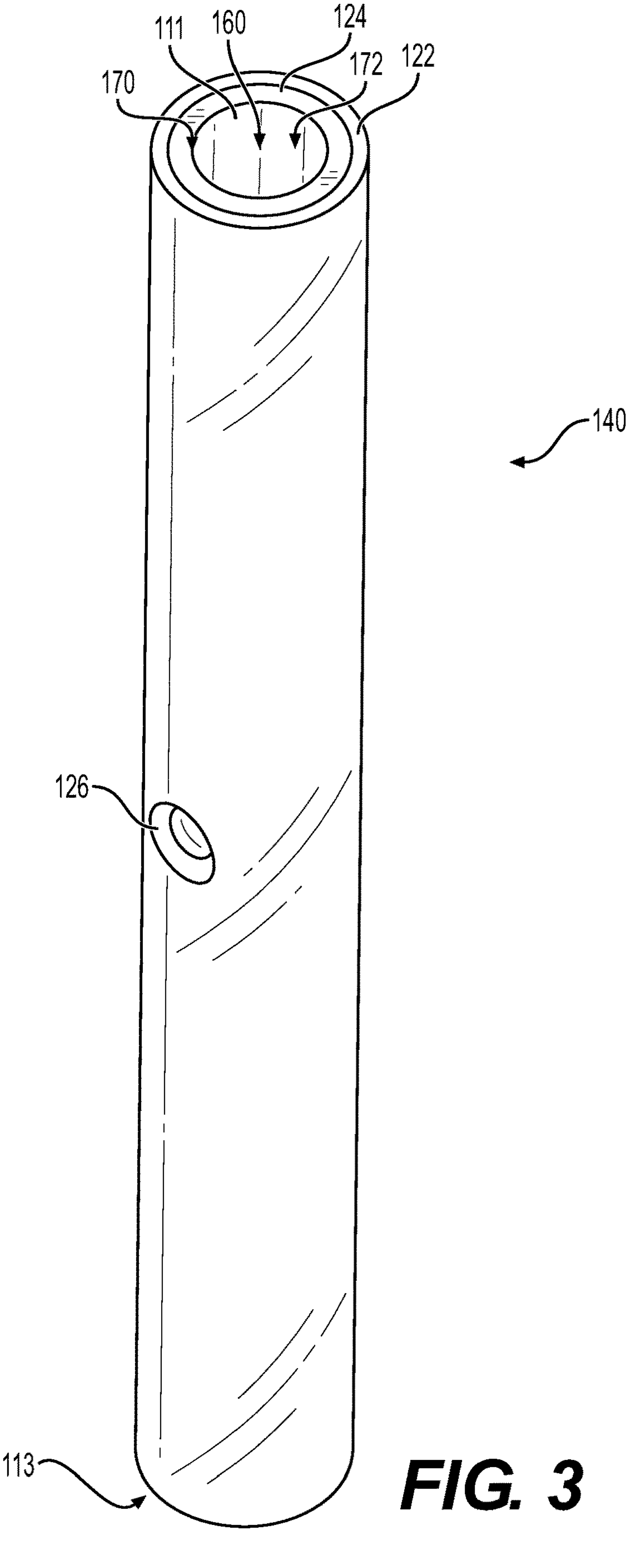
FIG. 3 is a perspective view of sleeve connector encompassing aspects of the present disclosure.

As shown in FIG. 3, each of the sleeve connectors 140 are configured as cylindrical tubes with at least one dimple 126 formed therein. Each sleeve connector 140 comprises a first connector end 111 and a second connector end 113. The second connector 113 can be aligned opposing the first connector end 111. The first connector end 111 comprises a first connector end lip 170 that defines a first connector end opening 172 in the sleeve connector 140. The first connector end opening 172 is in communication with a connector channel 160 that extends through the entire length of the sleeve connector 140 from the first connector end 111 to the second connector end 113. The connector channel 160 is cylindrical and has generally smooth inner surface that is interrupted by the connector dimple 126. The connector channel 160 is open at the first connector end 111 and the second connector end 113.

The sleeve connector 140 comprises a connector outer sleeve 122 and a connector inner sleeve 124. The connector outer sleeve 122 is concentrically aligned with the connector inner sleeve 124, which is friction fitted into the connector outer sleeve 122. Both of the connector outer sleeve 122 and the connector inner sleeve 124 can extend the entire length of the sleeve connector 140 from the first connector end 111 to the second connector end 113. The connector outer sleeve 122 is formed of a first material and the connector inner sleeve 124 is formed of a second material. In one aspect, the first material can be a metal and the second material can be a polymeric material. The connector outer sleeve 122 can provide strength, durability and rigidity to the connector sleeve 140, and the connector inner sleeve 124 can be flexible and/or deformable, so as to allow a tight, friction fit of a frame section end in the sleeve connector 140.

Figure 4:
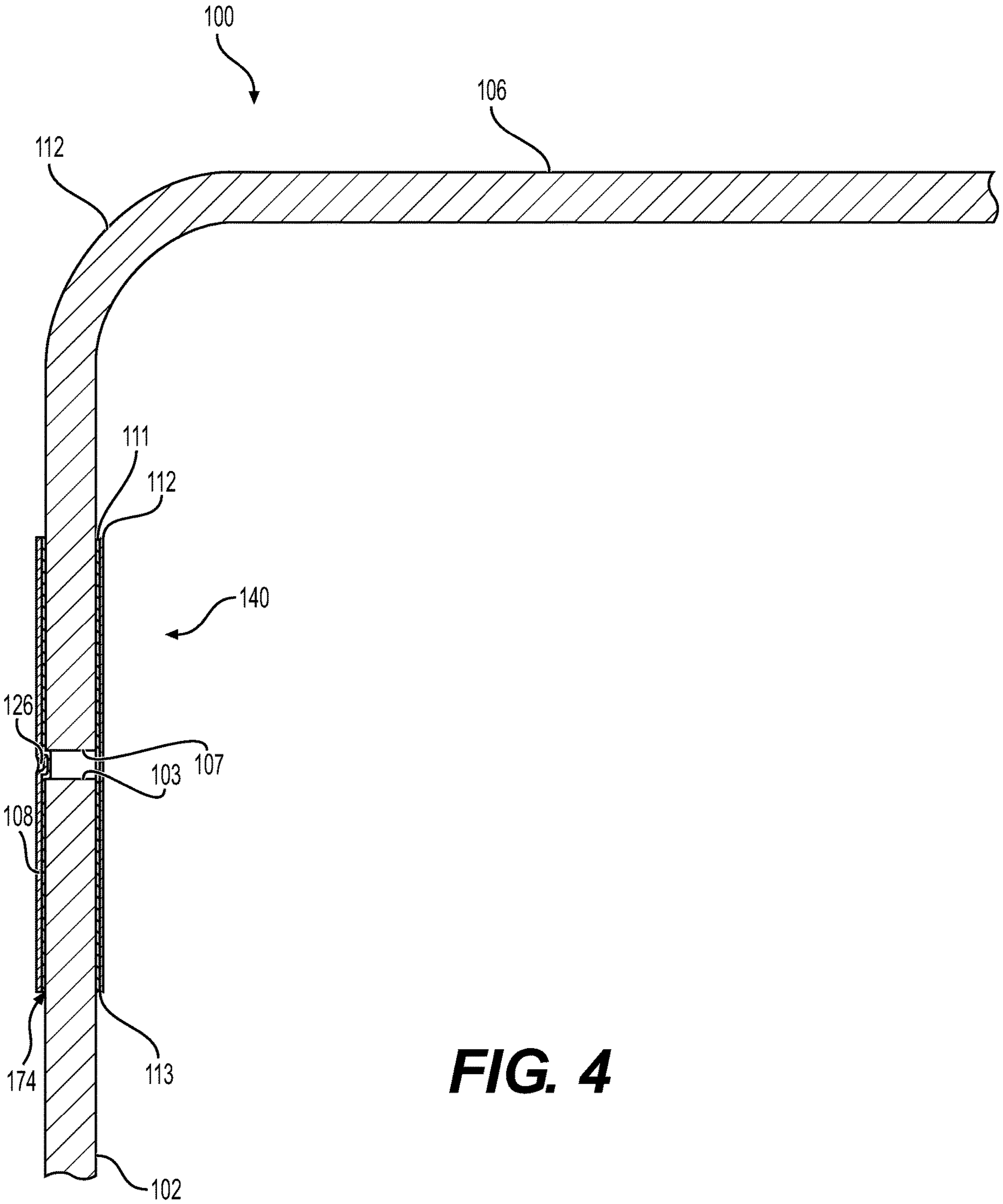
FIG. 4 is a cross-sectional view of a portion of the sign frame system shown in FIG. 1 in which the first sleeve connector, the first leg and the crossbar are shown operably connected.
Figure 5:
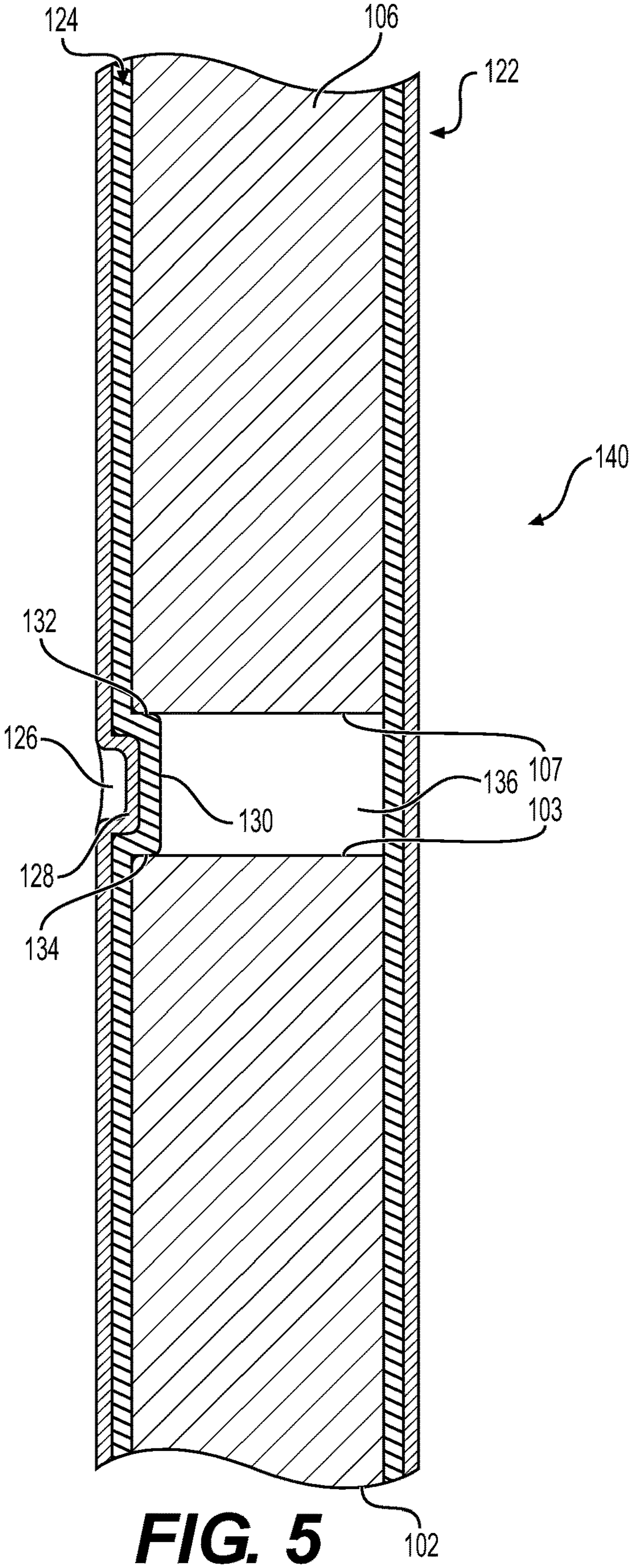
FIG. 5 is a cross-sectional view of a portion of the first sleeve connector, the first leg and the crossbar shown in FIG. 4.

As shown in FIGS. 3-5, the connector dimple 126 of the sleeve connector 140 forms a depression on the outer surface of the of the connector outer sleeve 122 and a protrusion on the connector inner sleeve 124 that projects into the connector channel 160. The connector dimple 126 comprises an outer sleeve dimple 128 and an inner sleeve dimple 130. As shown in FIGS. 4 and 5, the outer sleeve dimple 128 is formed in the connector outer sleeve 122, and the inner sleeve dimple 130 is formed in the connector inner sleeve 124. The connector dimple 126 defines a first frame section stop 132 and a second frame section stop 134. The first frame section stop 132 and the second frame section stop 134 are aligned along the surface of the connector channel 160. The portion of the connector channel 160 aligned between the first frame section stop 132 and the second frame section stop 134 is narrower than both the portion of the connector channel 160 aligned between the first connector end 111 and the first frame section stop 132 and the portion of the connector channel 160 aligned between the second frame section stop 134 and the second connector end 113. As shown in FIG. 5, the portion of the connector channel 160 bounded by the first frame section stop 132, the second frame section stop 134, and the circular band portion of the inner surface of the connector channel 160 extending circumferentially from the first frame section stop 132 and the second frame section stop 134 is the channel neutral volume 136.

As shown in FIG. 4, the crossbar 106 of the sign frame system 100 is detachably connected to the first leg 102 by the first connector 108, which is one of the sleeve connectors 140. The crossbar 106 comprises a crossbar end 107 that is inserted into the first connector end opening 172 and is disposed in the connector channel 160 of the sleeve connector 140. The crossbar end 107 is aligned adjacent and abuts the first frame section stop 132 formed by the connector dimple 126. Since the outer diameter of the crossbar end 107 is as, or nearly as, wide as the inner diameter of the portion of the connector channel 160 aligned between the first connector end opening 172 and the first frame section stop 132, the crossbar end 107 cannot extend beyond the first frame section stop 132 into the channel neutral volume 136, which has an inner diameter at is less than the outer diameter of the crossbar end 107. The first leg 102 comprises a first leg end 103 that is inserted in the second connector end opening 174 of the sleeve connector 160. The first leg end 103 is aligned adjacent and abuts the second frame section stop 134. Since the outer diameter of the first leg end 103 is nearly as, or nearly as wide as, the inner diameter of the portion of the connector channel 160 aligned between the second connector end opening 174 and the second frame section stop 134, the first leg end 103 cannot extend beyond the second frame section stop 134 into the channel neutral volume 136, which has an inner diameter that is less than the outer diameter of the first leg end 103. As a result, the first leg end 103 is spaced apart from the crossbar end 107 when the crossbar 106 is connected to the first leg 102. The crossbar 106 can be detached from the first leg 102 by removing one or both of the first leg end 103 and the crossbar end 107 from the sleeve connector 140. Each of the crossbar 106 and the first leg 102 are cylindrical and formed of metal wire or tubing. The diameter or each of the crossbar end 107 and the first leg end 103 are equal and linearly aligned.

Figure 6:
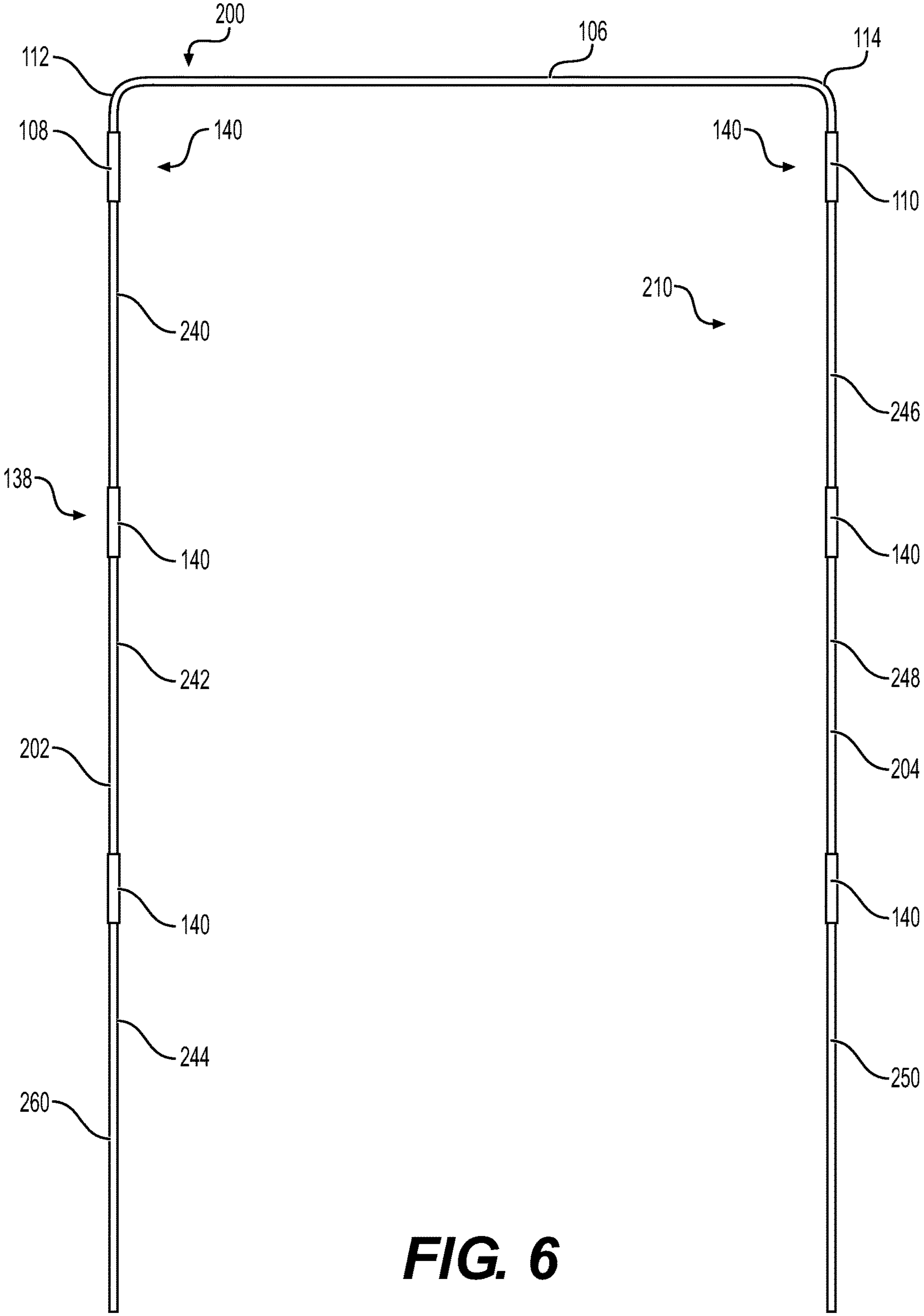
FIG. 6 is a front elevation view of another sign frame system encompassing aspects of the present disclosure.

FIG. 6 illustrates another sign frame system 200 that has a frame body 210 that can be used to support a bag sign or fold-over sign and encompassing aspects of the present disclosure. The sign frame system 200 comprises a crossbar 106 detachably connected to a first leg 202 and a second leg 204 aligned opposing the first leg 202. The crossbar 106 is detachably connected to the first leg 202 by a first sleeve connector 108, and the crossbar 106 is detachably connected to the second leg 204 by a second sleeve connector 110. The sign frame system 200 comprises a plurality of sleeve connectors 138 that detachably connect a plurality of frame sections to form a sign frame body 210 that can be used to support a bag sign or fold-over sign.

Each of the first leg 202 and the second leg 204 comprises a plurality of leg segments 260. The first leg 202 comprises a first upper leg segment 240 detachably connected to the crossbar 106 by a sleeve connector 140, a first mid leg segment 242 detachably connected to the first upper leg segment 240 by a sleeve connector 140, and a first lower leg segment 244 detachably connected to the first mid leg segment 242 by a sleeve connector 140. The second leg 204 comprises a second upper leg segment 246 detachably connected to the crossbar 106 by a sleeve connector 140, a second mid leg segment 248 detachably connected to the second upper leg segment 246 by a sleeve connector 140, and a second lower leg segment 250 detachably connected to the second mid leg segment 248 by a sleeve connector 140. The first leg 202 is aligned parallel with the second leg 204. The crossbar 106, the first leg 202, and the second leg 204 are in a planar alignment. Each of the first upper leg segment 240, the first mid leg segment 242, the first lower leg segment 244, the second upper leg segment 246, the second mid leg segment 248, and the second lower leg segment 250 are straight, cylindrical, thin, elongated frame sections formed of metal wire or tubing, whereas the crossbar 106 is an elongated, u-shaped frame section formed of the same or similar cylindrical metal wire as the other frame sections of the sign frame system 200.

Figure 7:
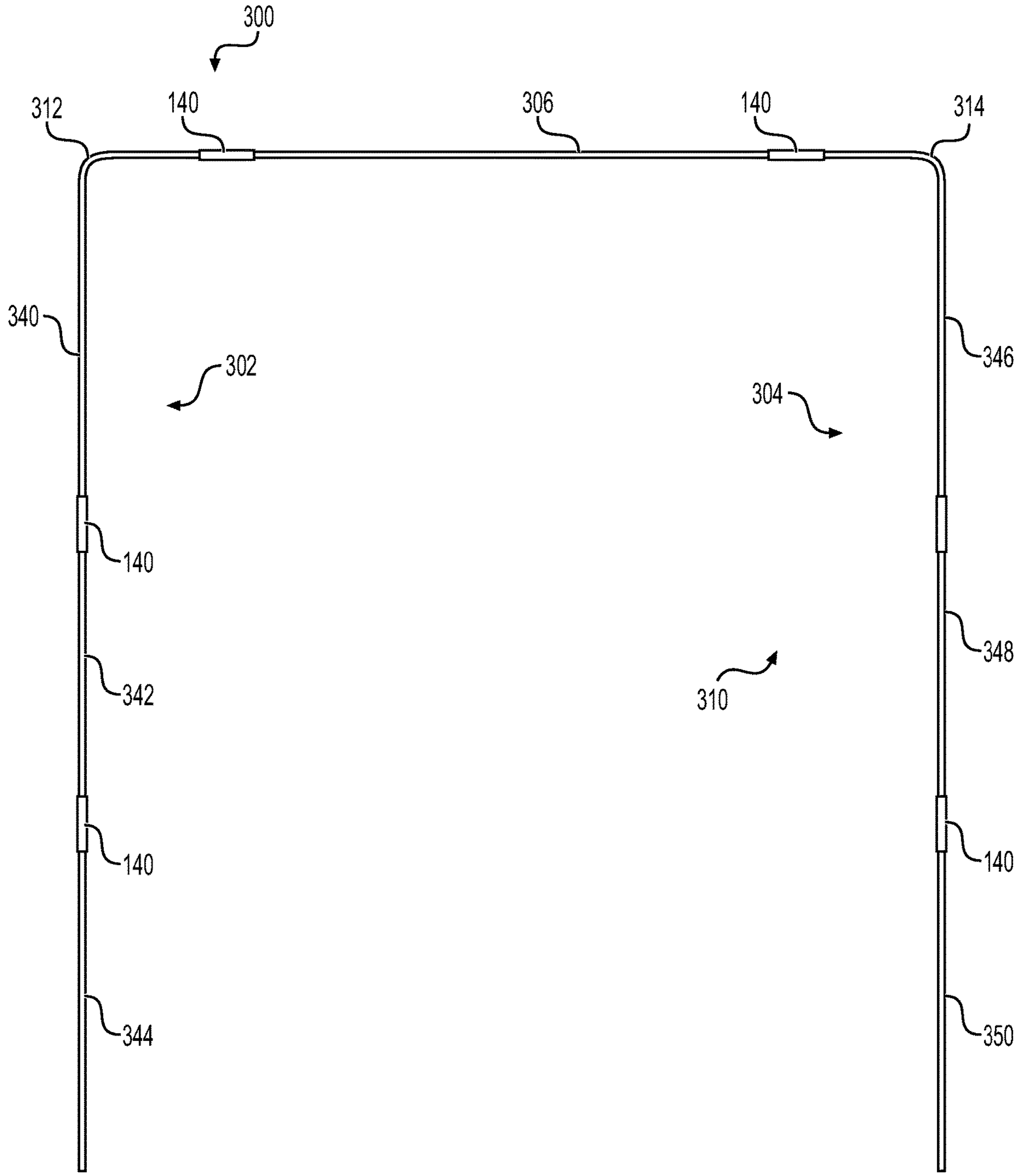
FIG. 7 is a front elevation view of a further sign frame system encompassing aspects of the present disclosure.

FIG. 7 illustrates yet another sign frame system 300 encompassing aspects of the present disclosure. The sign frame system 300 comprises a frame body 310 having a crossbar 306 detachably connected to a first leg 302 by a sleeve connector 140 and a second leg 304 by another sleeve connector 140, wherein the first leg 302 is aligned opposed and parallel to the second leg 304. The sign frame system 300 also comprises a first shoulder 312 and an opposing second shoulder 314. The first leg 302 comprises a first upper leg segment 340 detachably connected to the crossbar 306 by a sleeve connector 140, a first mid leg segment 342 detachably connected to the first upper leg segment 340 by a sleeve connector 140, and a first lower leg segment 344 detachably connected to the first mid leg segment 342 by a sleeve connector 140. The first shoulder 312 is formed in the first upper leg segment 340. The second leg 304 comprises a second upper leg segment 346 detachably connected to the crossbar 306 by a sleeve connector 140, a second mid leg segment 348 detachably connected to the second upper leg segment 346 by a sleeve connector 140, and a second lower leg segment 350 detachably connected to the second mid leg segment 348 by a sleeve connector 140. The second shoulder 314 is formed in the second upper leg segment 346. The crossbar 306 is a generally straight frame section formed of cylindrical metal wire or tubing. The crossbar 306, the first leg 302, and the second leg 304 are in a planar alignment.

Figure 8:
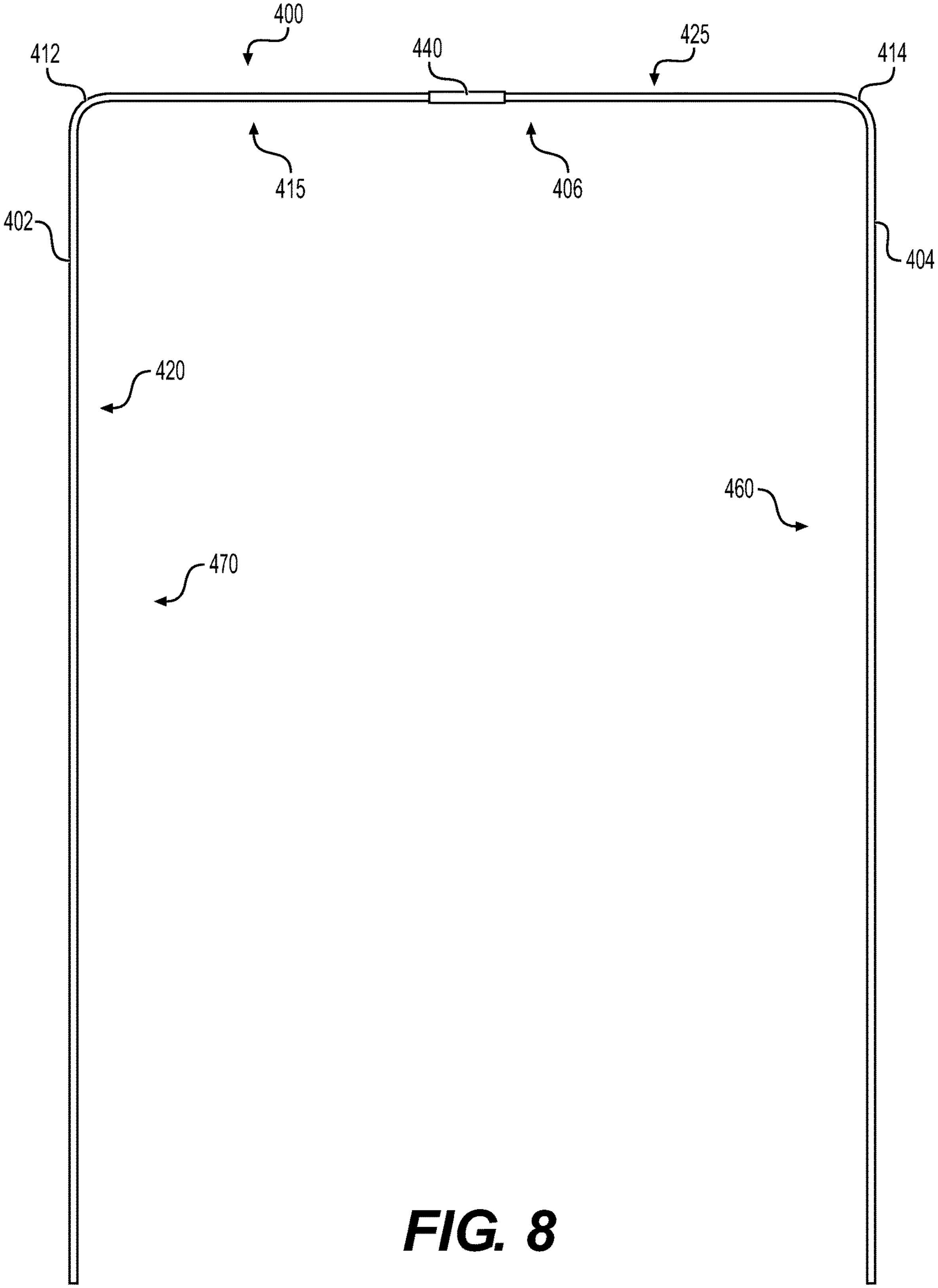
FIG. 8 is a front elevation view of still another sign frame system encompassing aspects of the present disclosure.
Figure 9:
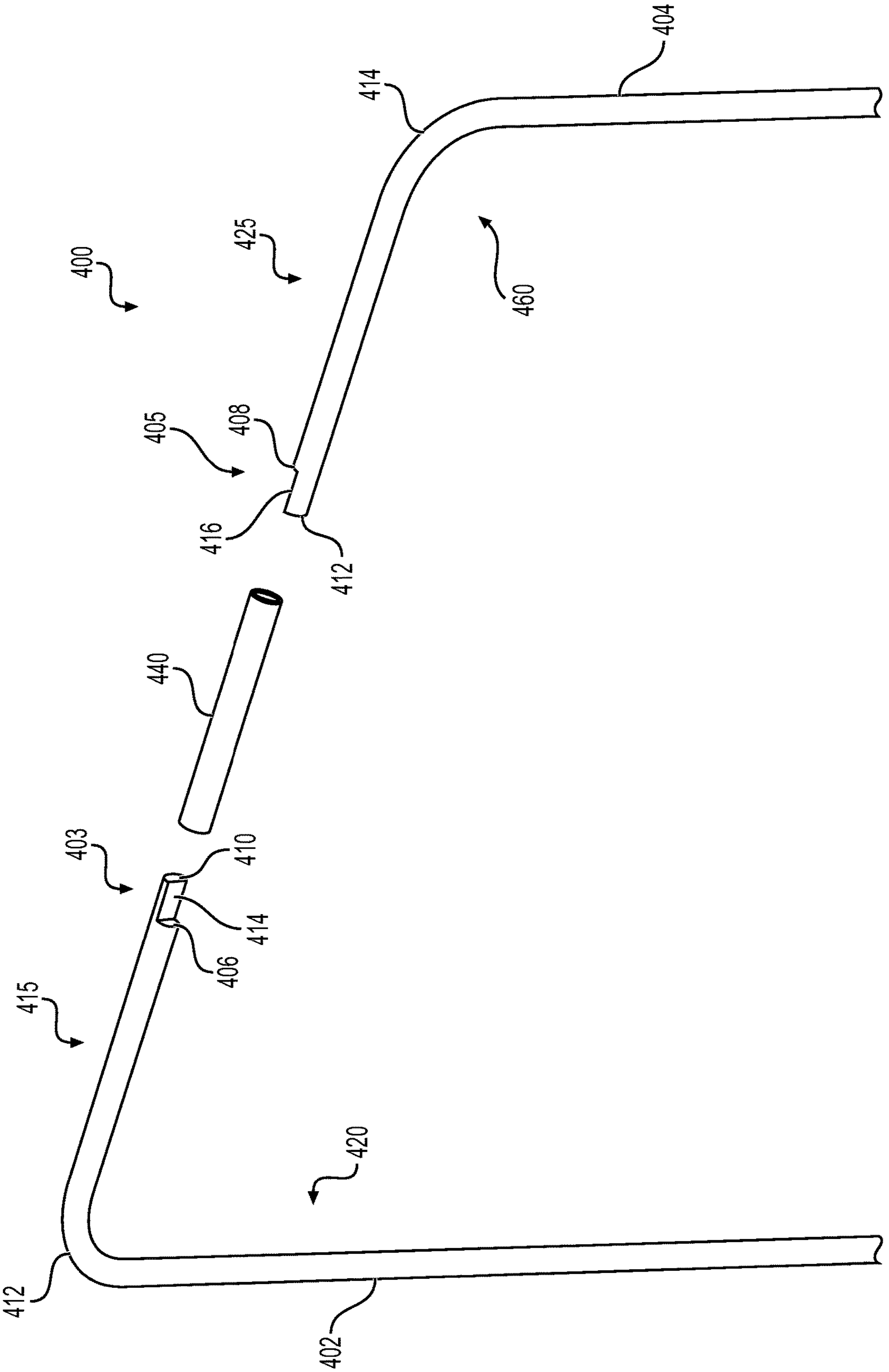
FIG. 9 is an exploded perspective view of an upper portion of the sign frame system shown in FIG. 8.
Figure 10:
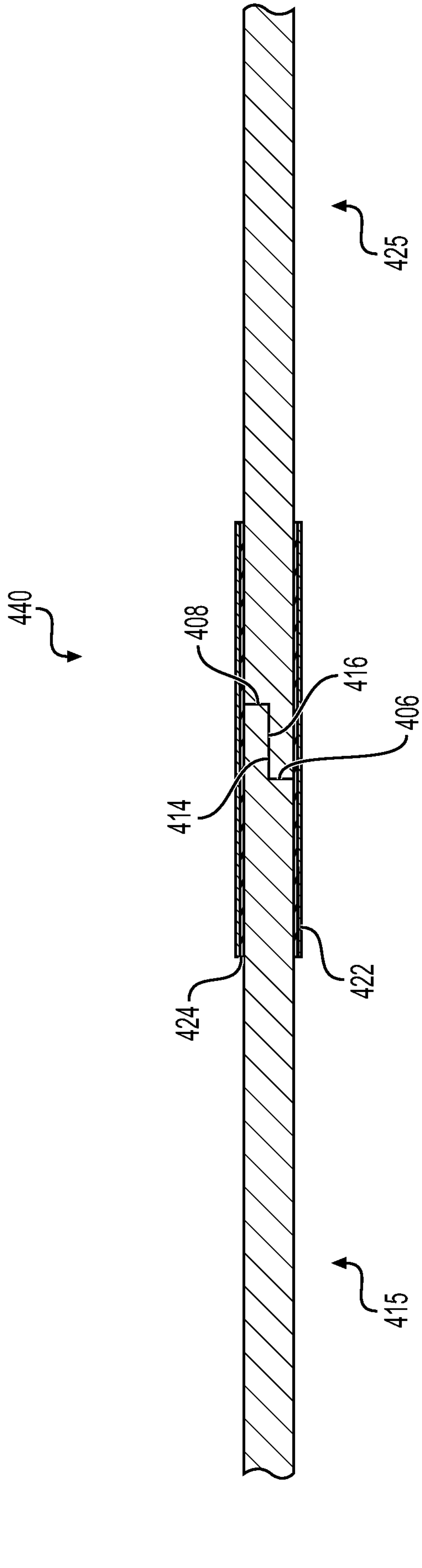
FIG. 10 is a top cross-sectional view an upper portion of the sign frame system shown in FIG. 8.

FIGS. 8-10 illustrate still another sign frame system 400 encompassing aspects of the present disclosure. The sign frame system 400 comprises a frame body 470 with a first frame section 420 detachably connected to a second frame section 460 by a sleeve connector 440. The first frame section 420 comprises a first leg section 402, a first crossbar section 415, and a first shoulder 412 disposed between the first leg section 402 and the first crossbar section 415. The first leg section 402 is straight and elongated, and is aligned perpendicular to the first crossbar section 415. The second frame section 460 comprises a second leg section 404, a second crossbar section 425, and a second shoulder 414 disposed between the second leg section 404 and the second crossbar section 425. The second leg section 404 is straight and elongated and aligned opposing the first leg section 402. The second leg section 404 is aligned perpendicular to the second crossbar section 425. The first crossbar section 415 and the second crossbar section 425 cooperate to define a frame crossbar 406 that extends between the first leg section 402 and the second leg section 404.

As shown in FIG. 9, the first frame section 420 comprises a first frame section end 403 aligned on the first crossbar section 415. The first frame section end 403 comprises a first end shoulder 406, a first tenon 410 extending outward beyond the first end shoulder 406, and a first cheek 414 formed on the first tenon 410. The second frame section 460 comprises a second frame section end 405 aligned on the second crossbar section 425. The second frame section end 405 comprises a second end shoulder 408, a second tenon 412 extending outward beyond the second end shoulder 408, and a second cheek 416 formed on the second tenon 412.

The sleeve connector 440 comprises a connector outer sleeve 422 and a connector inner sleeve 424 axially aligned and disposed within the connector outer sleeve 422. The connector outer sleeve 422 can be formed of a metal, and the connector inner sleeve 424 can be formed of a polymer, wherein the metal of the connector outer sleeve 422 provides strength and rigidity to the sleeve connector 440, whereas the polymer of the connector inner sleeve 424 is deformable. The sleeve connector 440 is cylindrical and has a cylindrical channel formed within and extending between a first open end and a second open end of the sleeve connector 440.

The first frame section end 403 is inserted into and aligned in a first open end of the sleeve connector 440, and the second frame section end 405 is inserted into and aligned in a second open end of the sleeve connector 440. The first frame section end 403 contacts and mates with the second frame section end 405 by the alignment of the respective end shoulders and tenons of the frame section ends. The first end shoulder 406 contacts the second tenon 412, and the second end shoulder 408 contacts the first tenon 410, with the first cheek 414 contacting the second cheek 416. This contact and alignment of the first frame section end 403 and the second frame section end 405 prevents or reduces the probability of the sign frame system 400 becoming bent, warped and/or misaligned because the first tenon 410 interacts with the second tenon 412 to prevent the rotation of the first frame section 420 relative to the second frame section 460.

Figure 11:
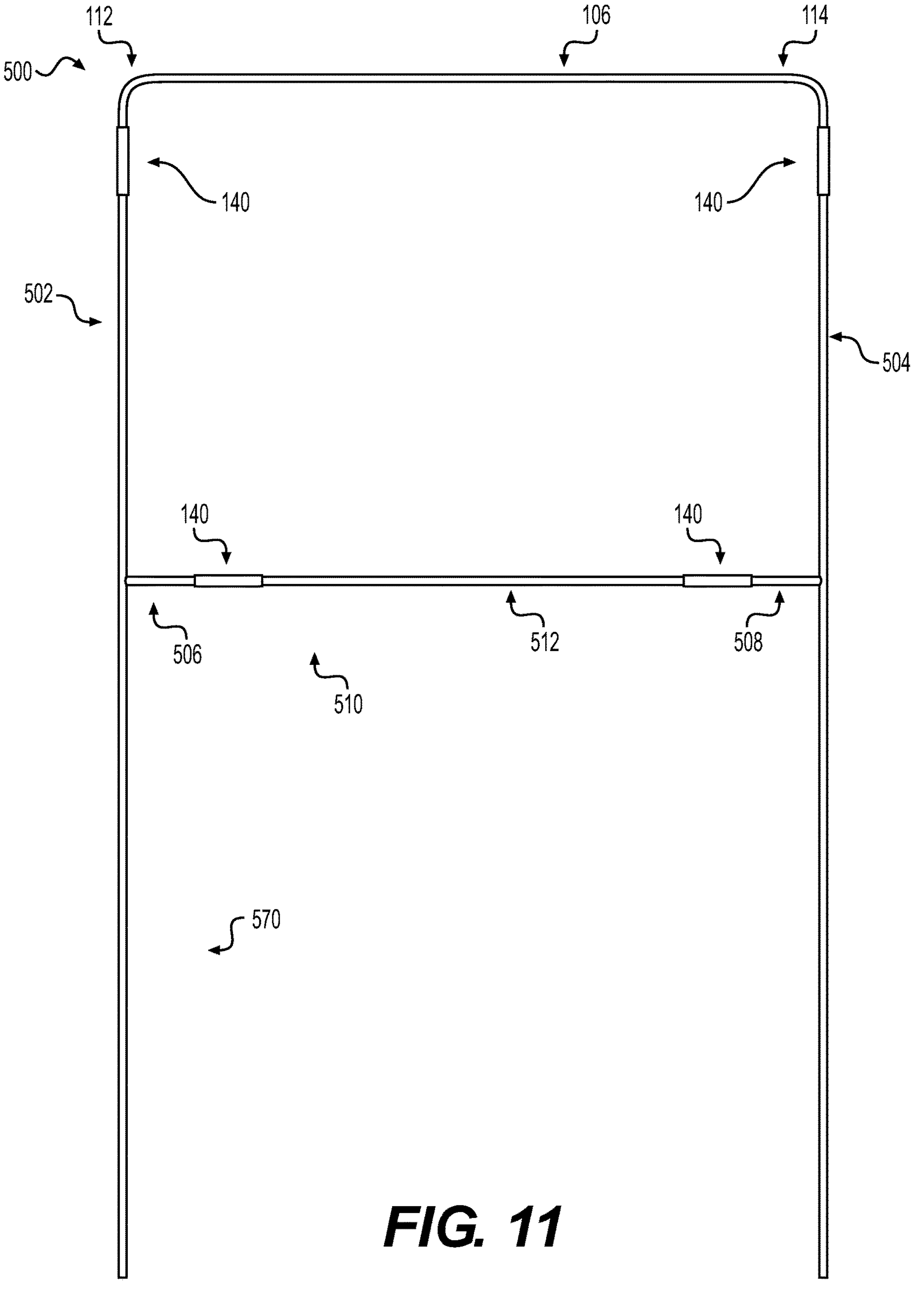
FIG. 11 is a front elevation view of another sign frame system encompassing aspects of the present disclosure.
Figure 12:
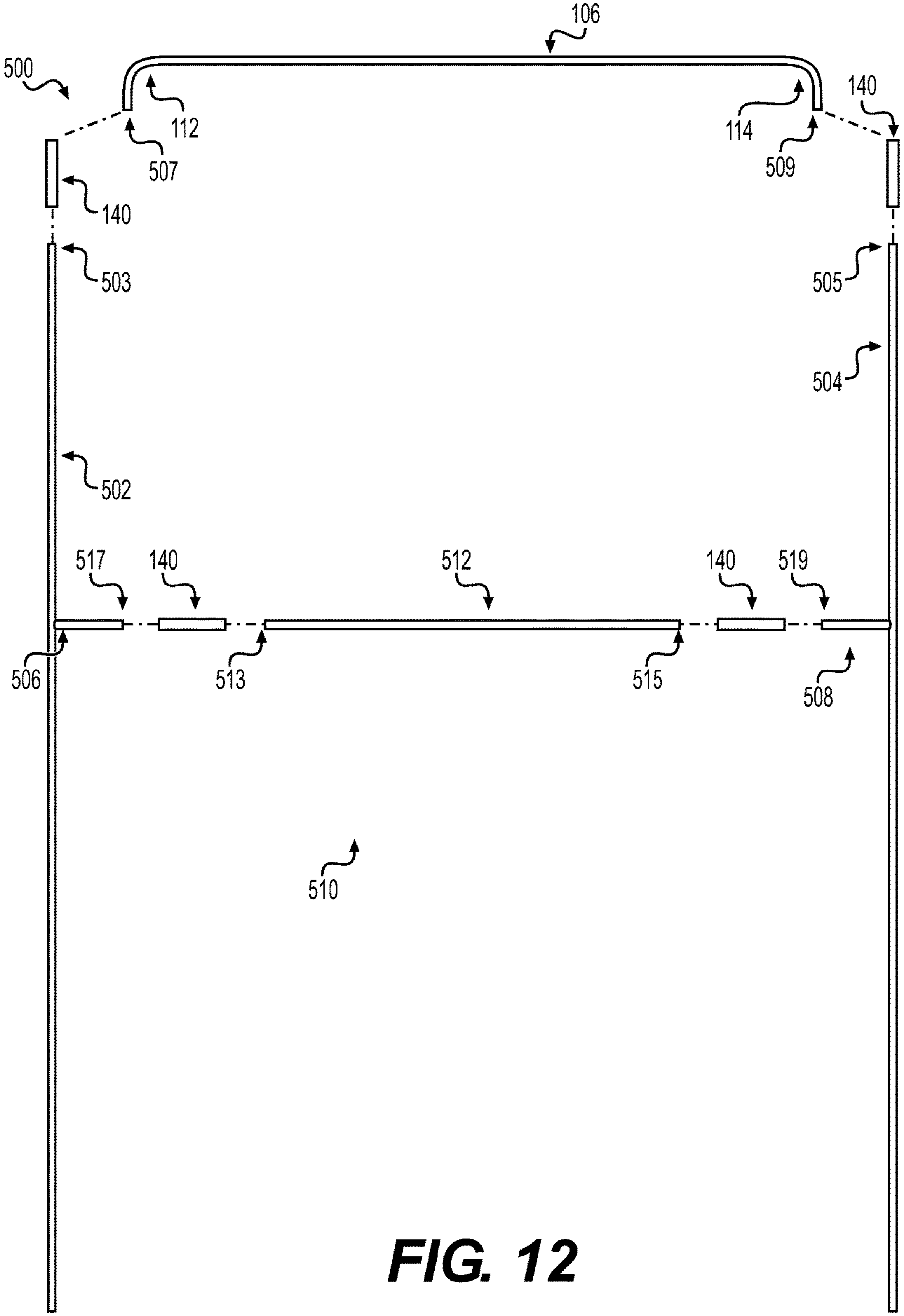
FIG. 12 is an exploded view of the sign frame system shown in FIG. 11.

FIGS. 11 and 12 illustrate a further sign frame system 500 encompassing aspects of the present disclosure. The sign frame system 500 comprises a frame body 570 having a plurality of crossbars extending between and connected to a plurality of legs. The sign frame system 500 comprises a crossbar 106. The crossbar 106 is detachably connected to a first leg 502 and a second leg 504. The frame body 570 has a first shoulder 112, an opposing second shoulder 114 formed in the crossbar 106. The crossbar 106 has a first crossbar end 507 aligned proximal the first shoulder 112, and a second crossbar end 509 aligned proximal to the second shoulder 114. The first crossbar end 507 is disposed in a sleeve connector 140, with the top end 503 of the first leg 502 also disposed in the same sleeve connector 140. The second crossbar end 509 is disposed in a sleeve connector 140, with the top end 505 of the second leg 504 also disposed in that sleeve connector 140.

The first leg 502 is detachably connected to the crossbar 106 by a sleeve connector 140. The first leg 502 is a straight, circular, elongated member formed of a circular wire or tubing. The first leg 502 has a first leg post 506 attached thereto and projecting perpendicularly therefrom. The first leg post 506 can be welded, or otherwise, attached to the first leg 502. The second leg 504 also is a straight, circular, elongated member formed of a metal wire or tubing. The second leg 504 is detachably connected to the crossbar 106 by a sleeve connector 140. The second leg 504 has a second leg post 508 attached thereto and projecting perpendicularly therefrom. The first leg post 506 is aligned intermediate between the top end 503 of the first leg 502 and the bottom end of the first leg 502, and the second leg post 508 is aligned intermediate between the top end 505 of the second leg 504 and the bottom end of the second leg 504.

The distance between the top end 503 of the first leg 502 and the first leg post 506 is equal to the distance between the top end 505 of the second leg 504 and the second leg post 508. The first leg post 506 is aligned linearly with the second leg post 506, and the first leg post end 517 is spaced apart from and aligned facing the second leg post end 519. The leg posts are welded, or otherwise securely attached, to the legs of the frame body 570.

The sign frame system 500 comprises an intermediate crossbar 510 spaced below the crossbar 106 and extending between the first leg 502 and the second leg 504. The intermediate crossbar 510 comprises the first leg post 506, a crossbar section 512 detachably connected to the first leg post 506 by a first sleeve connector 140, and the second leg post 508 detachably connected to the crossbar section 512 by a second sleeve connector 140. The first leg post end 517 and the first crossbar section end 513 are disposed in the first sleeve connector 140. The second leg post end 519 and the second crossbar section end 515 are disposed in the second sleeve connector 140. The intermediate crossbar 510 is spaced intermediate between the bottom of the frame body 570 and the top of the frame body 570. The intermediate crossbar 510 is aligned parallel to at least a portion of the crossbar 106 disposed between the first shoulder 612 and the second shoulder 614.

Figure 13:
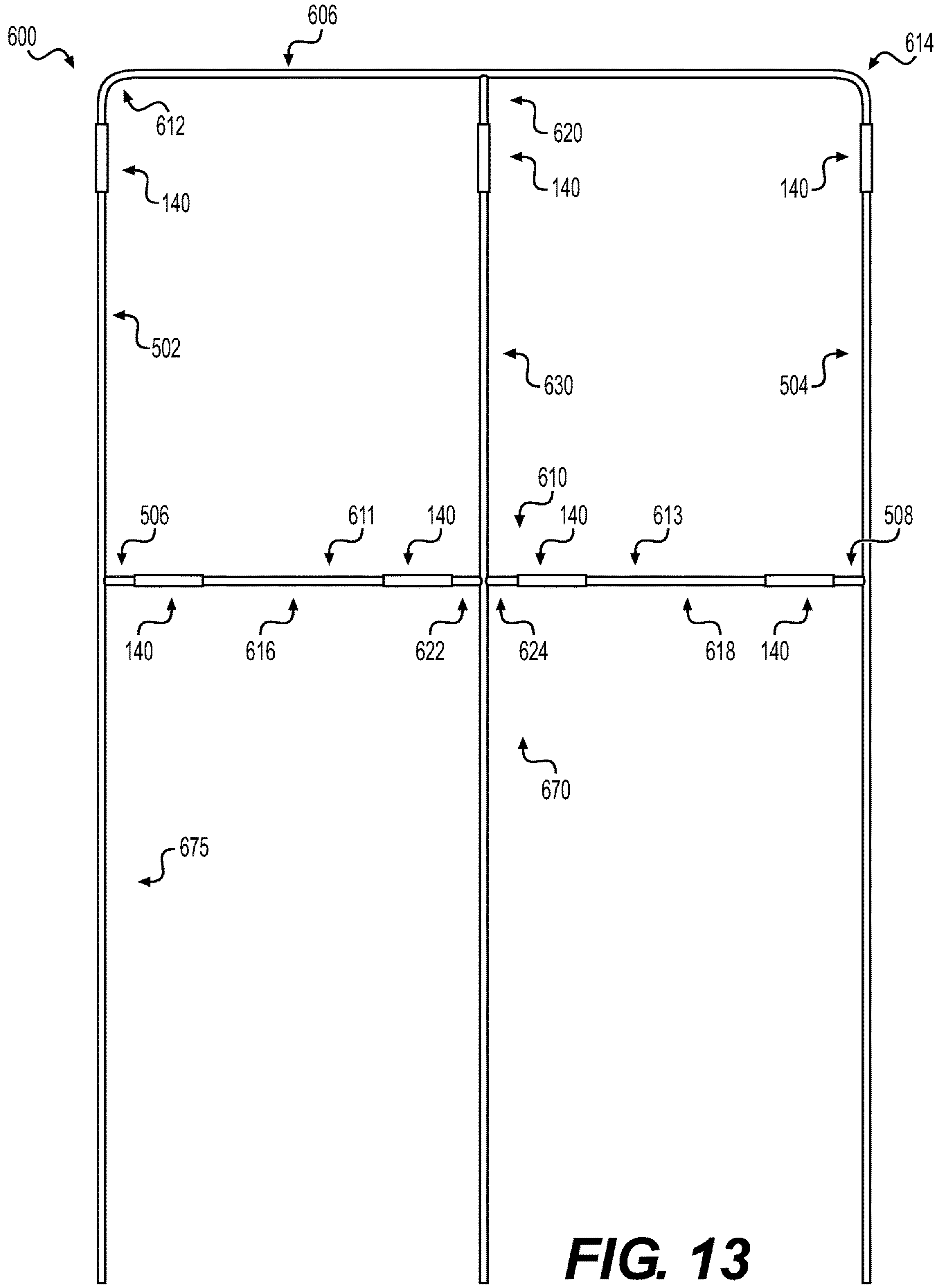
FIG. 13 is a front elevation view of still another sign frame system encompassing aspects of the present disclosure.
Figure 14:
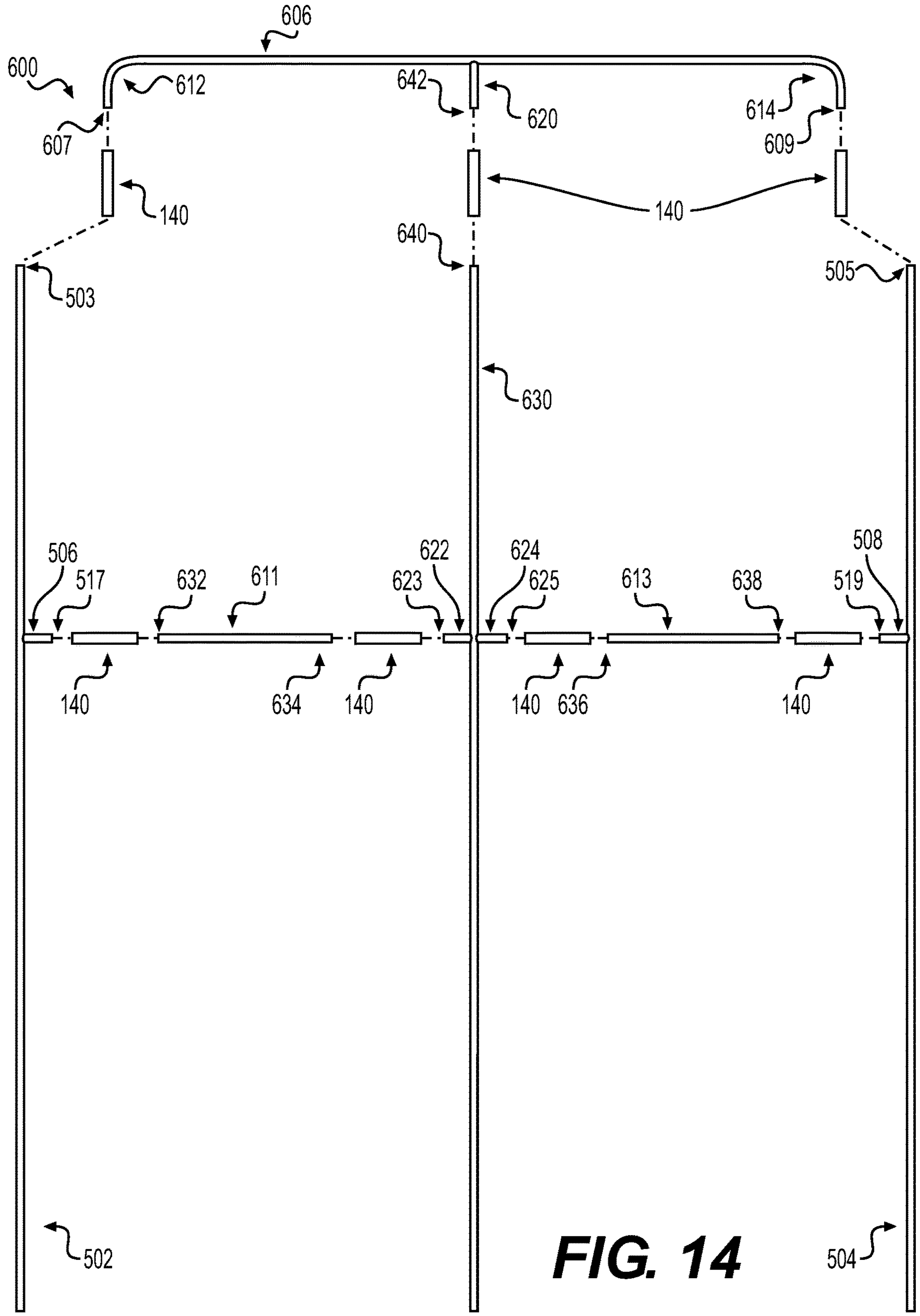
FIG. 14 is an exploded view of the sign frame system shown in FIG. 13.

FIGS. 13 and 14 illustrate yet another sign frame system 600 encompassing aspects of the present disclosure. The sign frame system 600 has a frame body 670 comprising a top crossbar 606 detachably connected to a plurality of legs 675. The frame body 670 also has an intermediate crossbar 610 detachably connected to the plurality of legs 675 and aligned intermediate between the top of the frame body 670 and the bottom of the frame body 670.

The plurality of legs 675 comprises a first leg 502 aligned on a first side of the frame body 670, a second leg 504 aligned on a second side of the frame body 670, and an intermediate leg 630 aligned intermediate between the first leg 502 and the second leg 504. The first leg 502, the second leg 504, and the intermediate leg 630 are aligned in a planar configuration and aligned parallel to each other. Each of the first leg 502, the second leg 504, and the intermediate leg 630 is aligned perpendicular the intermediate crossbar 610 and the portion of the top crossbar 606 disposed between the first shoulder 612 and the second shoulder 614 of the frame body 670.

The first leg 502 of the frame body 670 is detachably connected to the top crossbar 606 by a sleeve connector 140. The first leg 502 is a straight, circular, elongated member formed of a circular wire or tubing. The first leg 502 has a first leg post 506 attached thereto and projecting perpendicularly therefrom. The second leg 504 of the frame body 670 also is a straight, circular, elongated member formed of a circular wire or tubing. The second leg 504 is detachably connected to the top crossbar 106 by a sleeve connector 140. The second leg 504 has a second leg post 508 attached thereto and projecting perpendicularly therefrom. The first leg post 506 is aligned intermediate between the top end 503 of the first leg 502 and the bottom end of the first leg 502, and the second leg post 508 is aligned intermediate between the top end 505 of the second leg 504 and the bottom end of the second leg 504.

The distance between the top end 503 of the first leg 502 and the first leg post 506 is equal to the distance between the top end 505 of the second leg 504 and the second leg post 508. The first leg post 506 is aligned linearly with the second leg post 506, and the first leg post end 517 is spaced apart from and aligned with the second leg post end 519.

The intermediate leg 630 is a straight, circular, elongated member formed of a circular wire or tubing. The intermediate leg 630 is detachably connected by a sleeve connector 140 to a top crossbar post 620 attached to and extending downward from the top crossbar 606. The intermediate leg top end 640 of the intermediate leg 630 is disposed in the bottom opening of the sleeve connector 140, and the top crossbar post bottom end 642 is disposed in the top opening of the same sleeve connector 140.

The top crossbar 606 is detachably connected to the first leg 502 and the second leg 504. The frame body 670 has a first shoulder 612 and an opposing second shoulder 614, which are formed in the top cross bar 606. A first crossbar end 607 aligned proximal the first shoulder 612, and a second crossbar end 609 aligned proximal to the second shoulder 614. The first crossbar end 607 is disposed in a top opening of a sleeve connector 140 with the top end 503 of the first leg 502 disposed in the bottom opening of the same sleeve connector 140. The second crossbar end 609 is disposed in a top opening of another sleeve connector 140 with the top end 505 of the second leg 504 disposed in a bottom opening of the same sleeve connector 140.

The intermediate crossbar 610 comprises a first crossbar 616 disposed between and connected to the first leg 502 and the intermediate leg 630, and a second crossbar 618 disposed between and connected to the intermediate leg 630 and the second leg 504. The first crossbar 616 and the second crossbar 618 are aligned linearly with each other, in parallel with a portion of the top crossbar 606, and perpendicularly with the first leg 502, the intermediate leg 630 and the second leg 504. The first crossbar 616 comprises the first leg post 506, a first crossbar section 611 detachably connected to the first leg post 506 by a first sleeve connector 140, and a first intermediate leg post 622 attached to and projecting perpendicular from the intermediate leg 630. The first crossbar section 611 is detachably connected to the first intermediate leg post 622 by a second sleeve connector 140. The second crossbar 618 comprises a second intermediate leg post 624, a second crossbar section 613 detachably connected to the second intermediate leg post 624 by a third sleeve connector 140, and the second leg post 508 detachably connected to the second crossbar section 613 by a fourth sleeve connector 140. The second intermediate leg post 624 is aligned parallel with the first intermediate leg post 622 and projects away from the intermediate leg 630 in an opposite direction from first intermediate leg post 622.

As shown in FIG. 14, the first leg post end 517 and the first crossbar section first end 632 are disposed in the first sleeve connector 140. The first intermediate leg post end 623 and the first crossbar section second end 634 are disposed in the second sleeve connector 140. The second intermediate leg post end 625 and the second crossbar section first end 636 are disposed in the third connector 140. The second leg post end 519 and the second crossbar section second end 638 are disposed in the fourth sleeve connector 140.

The plurality of legs 675, the top crossbar 606, and the intermediate crossbar 610 are configured in a planar alignment. The sign frame system 600 is configured to support larger bag signs and fold-over signs while providing the strength, rigidity and anchoring points to maintain the position and alignment of the sign mounted on the frame body 670. Each of the first leg post 506, the second leg post 508, the first intermediate leg post 622, the second intermediate leg post 624, the first crossbar section 611, the second crossbar section 613, the top crossbar post 620, the top crossbar 606, the first leg 502, the second leg 504, and the intermediate leg 630 can be formed of a cylindrical metal wire or tubing with a consistent diameter for each of the components of the frame body 670 of the sign frame system 600.

Each of the respective connector outer sleeves 122 and 422 of the sleeve connectors 140 and 440 can comprise a metal. The metal can be bright basic steel, galvanized steel, stainless steel, and/or aluminum. Each of the respective connector inner sleeves 124 and 424 of the sleeve connectors 140 and 440 can comprise a polymeric material. The polymeric material can be polyethylene, polypropylene, and/or polyvinyl chloride. The connector outer sleeves 122 and 422 can be formed by cutting a portion of bright basic steel tube, stainless steel tube, galvanized steel tube, or aluminum tube to a desired length. These tubes can have a wall thickness of about 1 mm to about 2 mm, thereby resulting in the connector outer sleeves 122 and 422 having wall thicknesses in such a range. The wall thickness of the connector inner sleeves 124 and 424 can be in a range of about 0.5 mm to about 2 mm. Accordingly, the overall wall thickness of the sleeve connectors 140 and 440 can be in a range of about 1.5 mm to about 4 mm. The outer diameters of the sleeve connectors 140 and 440 can be in a range of about 5 mm to about 15 mm, and the inner diameters of the sleeve connectors 140 and 440 can be in a range of about 3 mm to about 10.5 mm.

The sign 120, which can be either a bag sign or a fold-over sign, can be provided with dimensions of about 61 cm in width by about 46 cm in height. For such a sign, the frame body 110 can be provided with dimensions of about 61 cm in width by about 81 cm in height. Alternatively, the sign 120 can have dimensions of about 61 cm in width by about 41 cm in height. For such a sign, the frame body 110 can be provided with dimensions of about 61 cm in width by about 81 cm in height. Additionally, the sign 120 can be provided with dimensions of about 66 cm in width by about 41 cm in height. For such a sign, the frame body 110 can be provided with dimensions of about 66 cm in width by about 81 cm in height.

A sign, which can be either a bag sign or a fold-over sign, that is used with the sign frame system 500 having a frame body 570 with a pair of crossbars can be provided with dimensions of about 91 cm in width and about 61 cm in height. For such a sign, the frame body 570 can be provided with dimensions of about 91 cm in width and about 117 cm in height.

A sign, which can be either a bag sign or a fold-over sign, that is used with the sign frame system 600 having a frame body 670 with two or more crossbars and three or more legs can be provided with dimensions of about 123 cm in width and about 81 cm in height, 123 cm in width and about 91 cm in height, or 123 cm in width and about 123 cm in width. For signs, the frame body 670 can be provided with dimensions of about 123 cm in width and about 160 cm in height.

The frame sections that make up the legs, crossbars, and posts of the frame bodies of the sign frame systems 100, 200, 300, 400, 500, and 600 can be made of a metal, such as bright basic steel wire, galvanized steel wire, spring steel, stainless steel, or small diameter steel tubing. The frame sections that make up the legs, crossbars, and posts of the frame bodies of the sign frame systems 100, 200, 300, 400, 500, and 600 can be cylindrical and can have diameters in the range of about 3.5 mm to about 10 mm.

Other embodiments of the present disclosure will be apparent to those skilled in the art from their consideration of the specification and practice of the present disclosure disclosed in this document. The applicant intends that the specification and examples be considered as exemplary only, with the true scope and spirit of the present disclosure being indicated by the following claims.

What is claimed is:

1. A sign frame system comprising:

a frame body comprising a crossbar, a first leg connected to the crossbar, a second leg connected to the crossbar, a first shoulder disposed between the crossbar and the first leg, and a second shoulder disposed between the crossbar and the second leg, wherein the frame body comprises a first frame section and a second frame section detachably connected to the first frame section by a sleeve connector, wherein the sleeve connector comprises a first connector end and a second connector end, wherein the sleeve connector comprises a connector channel extending from the first connector end to the second connector end, wherein the sleeve connector comprises a connector outer sleeve and a connector inner sleeve disposed in the connector outer sleeve, wherein the sleeve connector comprises a first connector opening formed in the first connector end and a second connector opening formed in the second connector end, wherein the sleeve connector comprises a connector dimple, wherein the connector dimple comprises an outer sleeve dimple formed in the connector outer sleeve and an inner sleeve dimple formed in the connector inner sleeve, wherein the connector dimple forms a first frame section stop in the connector channel and a second frame section stop in the connector channel, wherein the first frame section comprises a first frame section end, wherein the second frame section comprises a second frame section end, and wherein the first frame section end is disposed adjacent the first frame section stop in the connector channel and the second frame section end is disposed adjacent the second frame section stop in the connector channel.

2. The sign frame system of claim 1, wherein the first frame section end is spaced apart from the second frame section end in the connector channel.

3. The sign frame system of claim 1, wherein the connector outer sleeve comprises a metal.

4. The sign frame system of claim 1, wherein the connector inner sleeve comprises a polymer.

5. The sign frame system of claim 1, wherein the first frame section comprises a first frame section second end, wherein the first frame section second end comprises a first end shoulder and a first tenon projecting from the first end shoulder, wherein the first tenon comprises a first cheek, wherein the frame body comprises a third frame section detachably connected to the first frame section, wherein the third frame section comprises a third frame section first end, wherein the third frame section first end comprises a second end shoulder and a second tenon projecting from the second end shoulder, wherein the second tenon comprises a second cheek, wherein the frame body comprises a second sleeve connector detachably connected to the first frame section and the third frame section, wherein the first frame section second end and the third frame section first end are disposed in the second sleeve connector, wherein the first frame section second end contacts the third frame section first end, wherein the first end shoulder contacts the second tenon, wherein the second end shoulder contacts the first tenon, and wherein the first cheek contacts the second cheek.

6. The sign frame system of claim 1, wherein the frame body comprises a plurality of sleeve connectors.

7. The sign frame system of claim 1, wherein the frame body comprises a second crossbar connected to the first leg and the second leg.

8. The sign frame system of claim 7, wherein the frame body comprises an intermediate leg disposed between the first leg and the second leg, and wherein the intermediate leg is connected to the crossbar and the second crossbar.

9. The sign frame system of claim 1, wherein the first frame section and the second frame section cooperate to form the crossbar, the first leg, or the second leg.

10. A sign frame system comprising:

a frame body comprising a crossbar, a first leg connected to the crossbar, a second leg connected to the crossbar, a first shoulder disposed between the crossbar and the first leg, and a second shoulder disposed between the crossbar and the second leg, wherein the frame body comprises a first frame section and a second frame section detachably connected to the first frame section by a sleeve connector, wherein the first frame section comprises a first frame section end, wherein the first frame section end comprises a first end shoulder and a first tenon projecting from the first end shoulder, wherein the first tenon comprises a first cheek, wherein the second frame section comprises a second frame section end, wherein the second frame section end comprises a second end shoulder and a second tenon projecting from the second end shoulder, wherein the second tenon comprises a second cheek, wherein the frame body comprises a sleeve connector detachably connected to the first frame section and the second frame section, wherein the first frame section end and the second frame section end are disposed in the sleeve connector, wherein the first frame section end contacts the second frame section end, wherein the first end shoulder contacts the second tenon, wherein the second end shoulder contacts the first tenon, and wherein the first cheek contacts the second cheek.

11. The sign frame system of claim 10, wherein the sleeve connector comprises a connector outer sleeve and a connector inner sleeve axially aligned with the connector outer sleeve.

12. The sign frame system of claim 11, wherein the connector outer sleeve comprises a metal.

13. The sign frame system of claim 11, wherein the connector inner sleeve comprises a polymer.

14. The sign frame system of claim 10, wherein the frame body comprises a plurality of sleeve connectors.

15. The sign frame system of claim 10, wherein the frame body comprises a second crossbar connected to the first leg and the second leg.

16. The sign frame system of claim 15, wherein the frame body comprises an intermediate leg disposed between the first leg and the second leg, and wherein the intermediate leg is connected to the crossbar and the second crossbar.

17. The sign frame system of claim 10, wherein the first frame section comprises a first frame section second end, wherein the frame body comprises a third frame section detachably connected to the first frame section by a second sleeve connector, wherein the third frame section comprises a third frame section first end, wherein the second sleeve connector comprises a first connector end and a second connector end, wherein the second sleeve connector comprises a connector channel extending from the first connector end to the second connector end, wherein the second sleeve connector comprises a connector outer sleeve and a connector inner sleeve concentrically aligned with the connector outer sleeve, wherein the second sleeve connector comprises a first connector opening formed in the first connector end and a second connector opening formed in the second connector end, wherein the second sleeve connector comprises a connector dimple, wherein the connector dimple comprises an outer sleeve dimple formed in the connector outer sleeve and an inner sleeve dimple formed in the connector inner sleeve, wherein the connector dimple forms a first frame section stop in the connector channel and a second frame section stop in the connector channel, wherein the first frame section second end is disposed adjacent the first frame section stop in the connector channel, and wherein the third frame section first end is disposed adjacent the second frame section stop in the connector channel.

18. A sign frame system for a bag sign or a fold-over sign, the sign frame system comprising:

a frame body comprising a plurality of crossbars, a plurality of legs connected to the plurality of crossbars, and a plurality of frame sections detachably connected by a plurality of sleeve connectors, wherein the plurality of frame sections comprises a first frame section and a second frame section, wherein each sleeve connector of the plurality of sleeve connectors comprises a first connector end and a second connector end, a connector channel extending from the first connector end to the second connector end, a first connector opening formed in the first connector end and a second connector opening formed in the second connector end, and a connector dimple, wherein the connector dimple forms a first frame section stop in the connector channel and a second frame section stop in the connector channel, and wherein an end of the first frame section and an end of the second frame section are disposed in the sleeve connector.

19. The sign frame system of claim 18, wherein each sleeve connector of the plurality of sleeve connectors comprises a connector outer sleeve and a connector inner sleeve, and wherein the connector dimple comprises an outer sleeve dimple formed in the connector outer sleeve and an inner sleeve dimple formed in the connector inner sleeve.

20. The sign frame system of claim 18, wherein the plurality of frame sections comprises a third frame section, wherein the first frame section comprises a first frame section second end, wherein the first frame section second end comprises a first end shoulder and a first tenon projecting from the first end shoulder, wherein the first tenon comprises a first cheek, wherein the third frame section comprises a third frame section first end, wherein the third frame section first end comprises a second end shoulder and a second tenon projecting from the second end shoulder, wherein the second tenon comprises a second cheek, wherein the frame body comprises a connector detachably connected to the first frame section and the third frame section, wherein the first frame section second end and the third frame section first end are disposed in the connector, wherein the first frame section second end contacts the third frame section first end, wherein the first end shoulder contacts the second tenon, wherein the second end shoulder contacts the first tenon, and wherein the first cheek contacts the second cheek.

* * * * *